Figure 1:
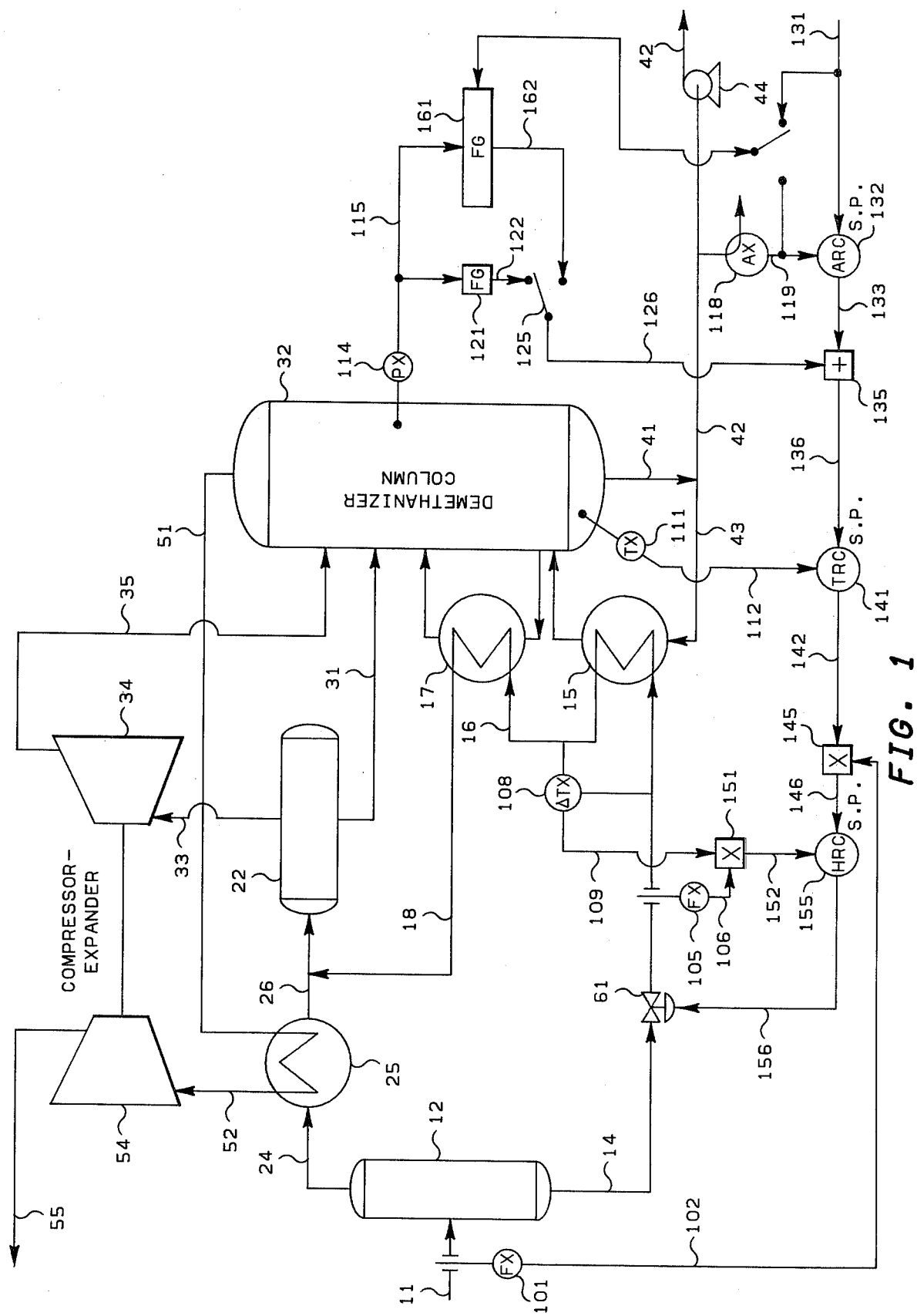

United States Patent [19]

Smith et al.

[11] 4,070,172
[45] Jan. 24, 1978

[54] PRESSURE RESPONSIVE FRACTIONATION CONTROL

[75] Inventors: Dexter E. Smith; Russel A. Buss; William S. Stewart, all of Bartlesville, Okla.

[73] Assignee: Phillips Petroleum Company, Bartlesville, Okla.

[21] Appl. No.: 745,719

[22] Filed: Nov. 29, 1976

[51] Int. Cl.² ............................................. F25J 3/02
[52] U.S. Cl. ........................................ 62/21; 203/2; 203/3
[58] Field of Search ............... 62/21, 37; 203/1–3; 196/132; 202/160

[56] References Cited

U.S. PATENT DOCUMENTS

| | | | |
|---|---|---|---|
| 2,917,437 | 12/1959 | Kleiss et al. | 203/2 |
| 2,939,293 | 6/1960 | Green | 62/21 |
| 3,342,702 | 9/1967 | Rijnsdorp | 203/2 |

Primary Examiner—Norman Yudkoff

[57] ABSTRACT

In a fractionation system in which pressure fluctuations within the fractionation vessel can result in alteration of the fractionator product composition, fractionation column pressure is monitored and converted to a temperature requirement signal representative of the temperature required within a preselected portion of the fractionation column in order to provide the desired product constituent distribution. The heat input to the fractionation column is controlled in response to the temperature requirement signal, corrected as necessary by actual analysis of the product. In a preferred embodiment, control of a demethanizer column in a cryogenic natural gas liquids separation process can be practiced advantageously.

21 Claims, 3 Drawing Figures

PRESSURE RESPONSIVE FRACTIONATION CONTROL

This invention relates to an apparatus and method for controlling the operation of a fractionation column in response to the pressure within the column. In another aspect the invention relates to an apparatus and method for providing stable control of a fractionation vessel in which the composition of a fractionation product can be altered by a fluctuation in pressure within the vessel. In yet another aspect the invention relates to an apparatus and method for control of the temperature in a preselected location within a fractionation column in response to measurement of the column pressure. In another aspect the invention relates to an apparatus and a method for controlling the operation of a fractionation column in response to both the pressure within the column and analysis of at least one column product. In still another aspect the invention relates to an apparatus and method for control of a demethanizer column associated with a natural gas liquids recovery process.

In the operation of any fractionation process there are numerous process variables which can cause an alteration of the composition of one or more of the fractionator product streams. One variable which can cause such disruption is the pressure within the fractionation column. While the pressure within the fractionation vessels of some fractionation processes may not ordinarily change so rapidly that analysis of the fractionation column product in question cannot be used to alter the column operating characteristics to avoid unwanted product composition changes, other processes are subject to relatively rapid pressure fluctuations which are a potential cause of instability in control of the fractionator product by use of automatic product analysis techniques alone.

In the demethanizer columns of natural gas liquids plants, for example, there are many sources of process upsets which result in rapid changes in the operating pressure of the column. In such systems product variation can result from pressure changes caused by a wide range of causes ranging from such seemingly insignificant events as a pipeline scraper or "pig" arriving in the line supplying natural gas to the process and similar disturbances to events certain to cause a substantial change in demethanizer column pressure such as failure of a compressor or expander associated with the process.

Previous control systems for liquid natural gas plants provide generation of a column bottom temperature set point signal in response to the output of an analyzer-controller with the output of the analyzer-controller being determined by the difference or error between the measured chromatographic analysis of the bottom product and a desired bottom product analysis. The control response of a cryogenic demethanizer to disturbances in bottom product composition using this system is relatively slow for the typical control application since a long time delay is associated with the mechanical and process equipment, there are inherent time delays in the conversion of disturbances within the column to changes in composition of the bottom product, and corrective action can not be initiated any more frequently than permitted by the sampling rate of the chromatographic analyzer.

Accordingly, an object of the invention is to provide an apparatus and method for controlling the operation of a fractionation column in response to the pressure within the column. Another object of the invention is to provide an apparatus and method for implementing stable control of a fractionation vessel in which the composition of a fractionation product can be altered by a fluctuation in temperature within the vessel. Yet another object of the invention is to provide an apparatus and method for control of the temperature in a preselected location within a fractionation column in response to measurement of the column pressure. Another object of the invention is to provide an apparatus and method for controlling the operation of a fractionation column in response to both the pressure within the column and analysis of at least one column product. Still another object of the invention is to provide an apparatus and method for control of a demethanizer column associated with a natural gas liquids recovery process.

In accordance with the invention the pressure within a fractionation column is used in conjunction with analysis of a fractionation column product stream to maintain a column temperature necessary to provide a desired product stream composition. In a presently preferred embodiment of the invention the heat flow to the reboiler of a fractionation column is controlled to provide a desired column bottom product composition. In particular, the bottom product composition if preferably expressed in terms of the proportion or ratio in which key product constituents are found. The control system of the invention increases the rapidity of the response of a fractionating column as well as increasing the effectiveness of the fractionating column control system.

As applied to a natural gas liquids separation facility, the apparatus and method of the invention are preferably utilized to control the methane to ethane ratio in the bottom product of a demethanizer column by manipulating the rate of heat input to a reboiler associated with the column to maintain a desired bottom product temperature. The temperature required to achieve a specified methane to ethane ratio in the natural gas liquid bottom product of the demethanizer column is primarily a function of column pressure and feed composition. The bottom temperature set point is determined by combining a primary temperature requirement signal for adjustment of the column bottom temperature set point as a function of column pressure with a bias signal provided by an analysis controller based on the measured methane to ethane ratio in the NGL product. This control arrangement differs significantly from previous systems in that the primary signal for the temperature set point is dependent upon column pressure and the chromatograph derived signal is used only for biasing or feedback trimming. This arrangement provides significantly better methane to ethane ratio control in the NGL product, especially during major disturbances such as turbo-expander startups and failures.

Figure 2:
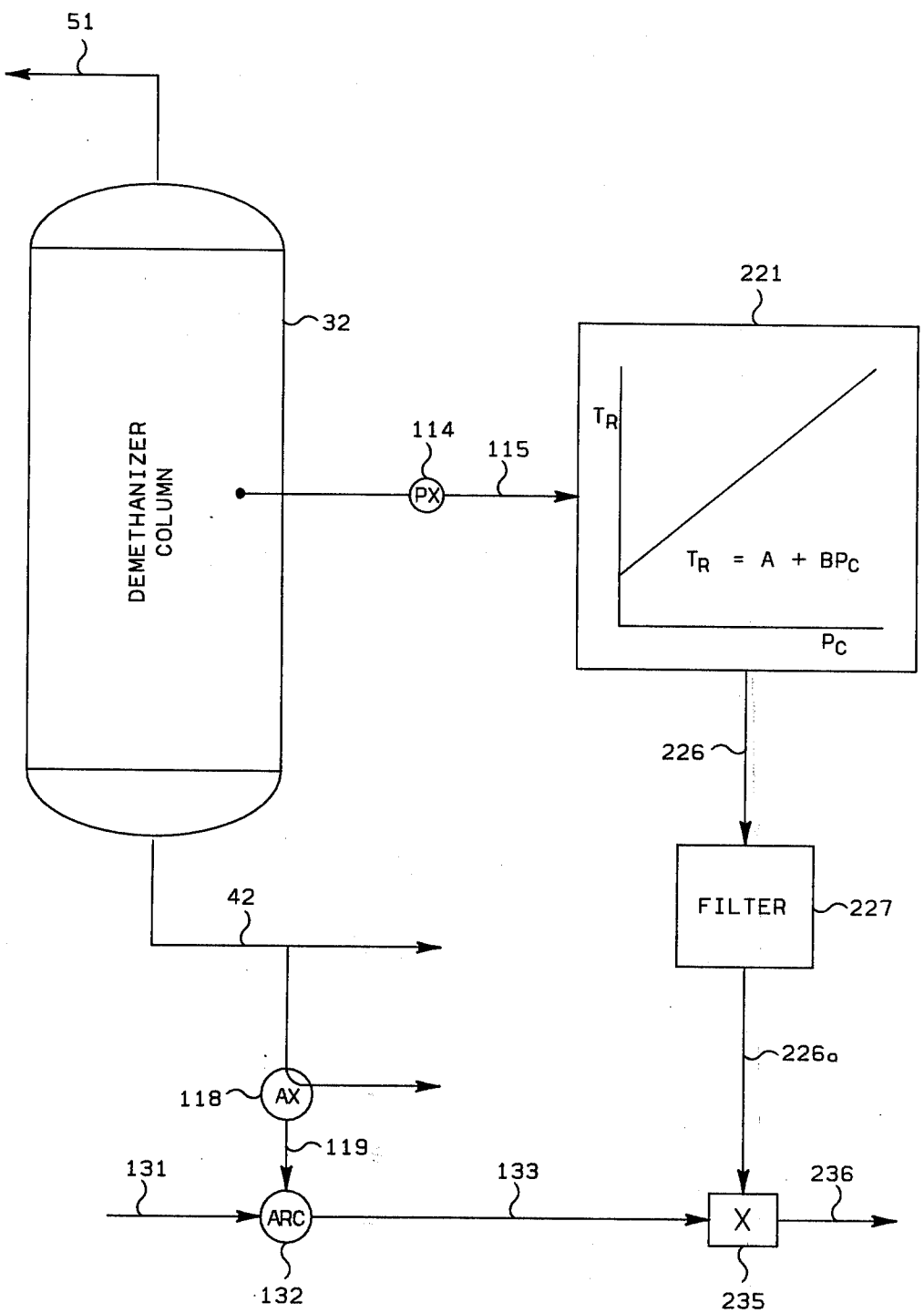
Figure 3:
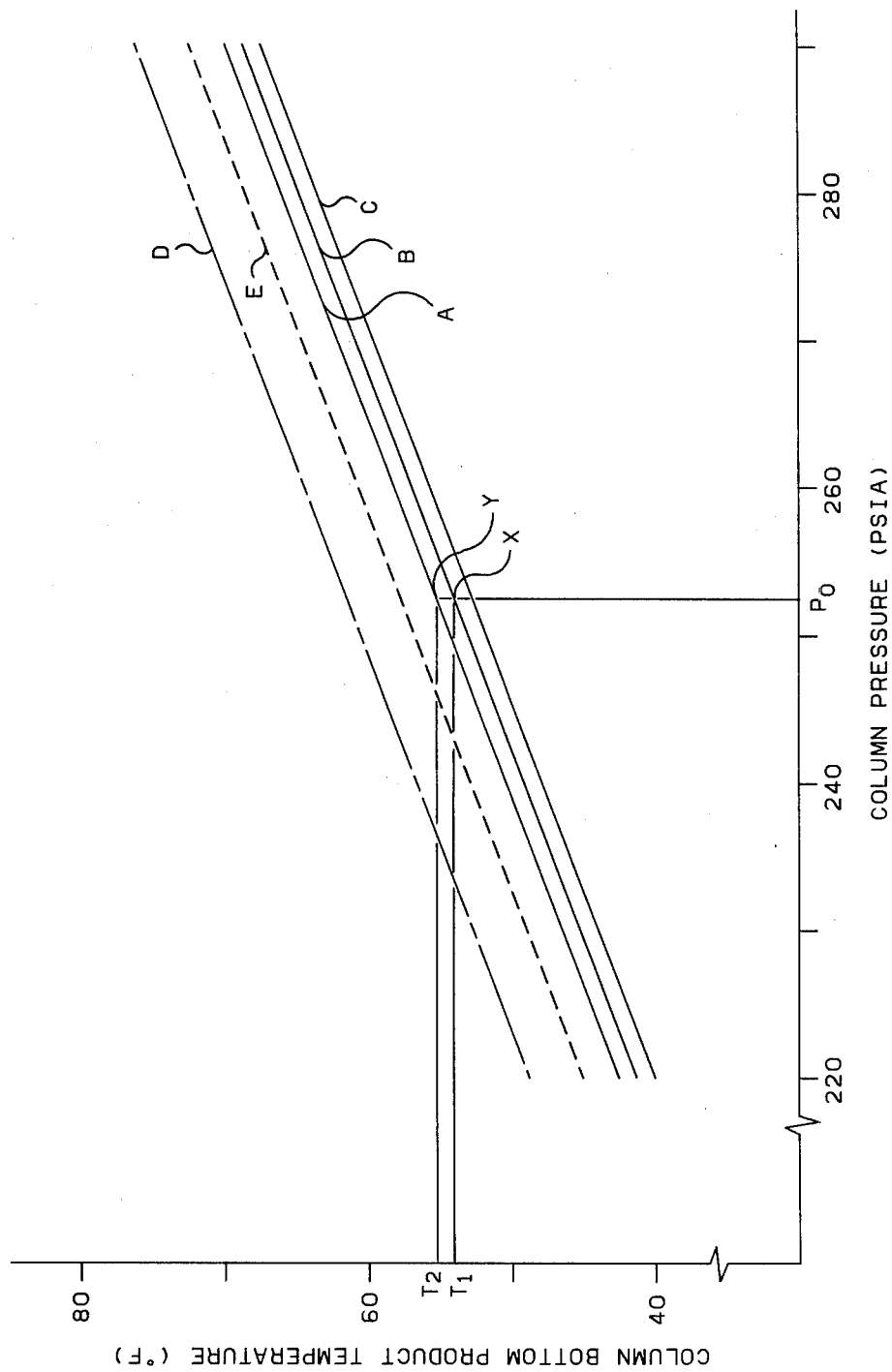

Typically a chromatographic analyzer can provide new measurements of the methane to ethane ratio in the NGL product about every 1 to 2 minutes. The availability of feedback data only every 1 to 2 minutes when the residence time for the system is between 70 and 90 seconds deteriorates the control system performance in the absence of the apparatus and method of the present invention. Implementation of column pressure measurement in accordance with the invention, however, to predict the bottom temperature required for producing a specified methane to ethane ratio in the NGL bottom product, reduces the process response time by translating pressure changes immediately into temperature requirements and by providing a continuously updated pressure-derived signal to continuously reset the fractionation column bottom temperature set point. A more complete understanding of the invention as well as additional objects and advantages thereof will become apparent from the following detailed description of the invention and from the appended claims thereto as well as from a description of the drawings in which FIG. 1 is a schematic representation of a natural gas liquids recovery system implemented in accordance with the invention;

FIG. 2 is a particularly preferred embodiment of a portion of the control system illustrated by FIG. 1; and FIG. 3 is a graphical representation of a portion of the fractionating column temperature-pressure characteristic for a cryogenic demethanizer column under various operating conditions.

Referring now to FIG. 1, there is illustrated a natural gas liquids recovery system wherein a feedstream of compressed raw natural gas is provided through a feed conduit 11 to a separation vessel 12. From the separation vessel 12 a liquid portion of the feedstream is passed through a liquid conduit means 14, a reboiler heat exchange means 15, a connecting conduit means 16, a column side heat exchange means 17 and a conduit means 18 to a second separation vessel 22. The gaseous feed material from the separator 12 is conveyed through a conduit means 24, a heat exchange means 25 and a conduit means 26 to the second separation vessel 22. The liquid feed material from the second separation vessel 22 is provided through a conduit means 31 as a liquid feedstream to a demethanizer column 32. The vapor portion of the material within the second separation means 22 is provided through a conduit means 33 to an expander means 34. The output of the expander means 34 is connected by a conduit means 35 to the demethanizer column 32 in order to provide the combined vapor and liquid-containing stream from the output of the expander 34 as a feedstream to the demethanizer column 32. A demethanizer column bottom conduit 41 delivers natural gas liquid product material from the bottom of the demethanizer column 32 to a bottom product conduit means 42 and to a reboiler conduit means 43. A portion of the bottom product of the demethanizer column 32 is therefore circulated through the reboiler heat exchange means 15 and returned to the demethanizer column 32 by the conduit means 43, and the remainder of the liquid bottom product is provided by the conduit means 42 as a natural gas liquid product. Suitable means for providing the desired flow of various streams associated with the process illustrated by FIG. 1 such as the pump means 44 located within the conduit means 42 are ordinarily provided as needed but have, in general, been omitted from the schematic drawing of FIG. 1 in the interest of ease of illustration. Similarly, other equipment may commonly be associated with the illustrated system to provide alternative operation during equipment outages such as a bypass conduit (not shown) for bypassing the expander 34 and connecting conduit 33 directly to conduit 35 in the event of an expander failure or malfunction.

The overhead vapor product of the demethanizer column 32 is provided by a conduit means 51 through the heat exchange means 25 and a conduit means 52 as an overhead product stream for use as appropriate. In many instances the gaseous product can be provided by a branch of the conduit means 52 as fuel for another portion of the process or a related process. Ordinarily at least a portion of the gaseous stream from the conduit means 52 is compressed by a suitable compressor means 54 which can be driven, for example, by the expander means 34 and a compressed ovehead gas stream is delivered from the process by means of an overhead product conduit means 55.

In operation, the process illustrated by FIG. 1 is carried out at subambient temperatures. A typical temperature within the top portion of the demethanizer column 32, for example, would be about $-150°$ F. (about $-100°$ C.). The feed material entering the system through the feed conduit 11, therefore, will be of a relatively high temperature and can be utilized as a source of heat. The liquid portion of the feed material provided to the reboiler heat exchange means 15 and side heat exchanger 17 is therefore utilized as a source of heat to provide the desired operating characteristics within the demethanizer column 32 and, at the same time, the liquid feed material is cooled during its passage through the heat exchange means 15 and 17. The vapor feed material provided by the conduit means 24 to the heat exchange means 25 is cooled by providing heat to the overhead product material in the heat exchanger means 25. The effect of the expansion carried out within the expander means 34 provides substantial cooling and partial condensation of the gaseous material provided thereto. The energy removed from the gaseous material during this cooling step can be advantageously provided to the compressor means 54 by means of a direct mechanical linkage between the expander means 34 and the compressor means 54.

While a considerable amount of control equipment is ordinarily utilized in controlling a process such as the one schematically illustrated by FIG. 1, only that control equipment relevant to operation of the present invention is illustrated by FIG. 1. A flow transducing means 101 produces a feed flow signal 102 representative of the rate of flow of feed material through the conduit 11 to the process. The flow transducer means 101 can be selected from a variety of equipment known in the art such as an orifice flowmeter and as other equipment hereinafter described, is considered to include any additional scaling or similar apparatus necessary to provide a flow rate signal 102 compatible with the other equipment utilized and suitable for use as hereinafter described. A valve means 61 located within the conduit means 14 is provided for controlling the flow rate of material through the conduit means 14. The flow rate of material through the conduit means 14 is measured by a flow transducer means 105 which delivers a flow rate signal 106 representative thereof. The temperature differential between the feed material entering the reboiler heat exchange means 15 and the feed material exiting the reboiler heat exchanger is measured by a temperature differential transducer means 108 which delivers a temperature differential signal 109 representative of the measured temperature difference. A temperature transducing means 111 associated with the bottom of the demethanizer column 32 produces a bottom temperature signal 112 reprsentative of the measured temperature of the product at the bottom of the demethanizer column. A pressure transducer 114 is adapted to deliver a column pressure signal 115 representative of the pressure at a preselected position within the demethanizer column 32. An analysis transducing means 118 is adapted to accept a sample of bottom product material from the bottom product conduit means 42 and to deliver an analysis signal 119 representative of the composition of the bottom product stream. In particular, a preferred analysis transducer 118 produces an analysis signal 119 representative of the ratio of two preselected product constituents exiting the fractionation column as a bottom product stream. In the case of the illustrated natural gas liquids separation process, a preferred analysis transducing means 118 produces an analysis signal 119 representative of the ratio of methane to ethane within the bottom product.

The various transducing means used to measure parameters which characterize the process and the various signals generated thereby may take a variety of forms or formats. For example, the control elements of the system can be implemented utilizing electrical analog, digital electronic, pneumatic, hydraulic, mechanical or other similar types of equipment or combinations of one or more of such equipment types. While the presently preferred embodiment of the invention preferably utilizes a combination of pneumatic control elements such as a pneumatically operated valve means 61 in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flowmeter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

The pressure signal 115, representative of the pressure within the demethanizer column 32, is converted by a function generating means 121 to an equivalent temperature signal 122 representative of the bottom temperature within the demethanizer column 32 required to provide a preselected methane to ethane bottom product ratio at a preselected feed material composition. A switch means 125 selects from one or more equivalent temperature signals such as the signal 122 to provide a temperature requirement signal 126 representative of the temperature which must be maintained at the bottom of the demethanizer column in order to provide a demethanizer bottom product having a preselected methane to ethane ratio.

A bottom product set point signal 131 representative of the desired ratio of methane to ethane in the bottom product of the demethanizer column is provided as a set point signal to an analysis recorder-controller means 132 which produces an analysis control signal 133 in response to the difference between the analysis set point signal 131 and the measured analysis signal 119. While the analysis recorder-controller can be any suitable control means known in the art, a preferred analysis recorder-controller means performs a control function ordinarily referred to by those skilled in the art as proportional-integral-derivative control wherein the controller response is of the general form $$S_0 = K_1 + K_2 E + K_3 \frac{dE}{dt} + K_4 \int E\, dt$$

where $S_0$ is the controller output signal, $E$ is the error or difference between the set point signal and measurement signal provided to the controller, $t$ is time and $K_1$, $K_2$, $K_3$ and $K_4$ are constants. Depending upon the particular control circumstances and requirements, one or more of the constants $K_1$, $K_2$, $K_3$ or $K_4$ can be zero.

The control function of the analysis recorder-control means 132 is chosen to provide as the output signal 133 thereof a correction signal which can be used to alter the selected temperature requirement signal 126 to compensate for any difference which may exist between the measured methane to ethane ratio within the bottom product and the methane to ethane ratio upon which the conversion of column pressure to equivalent temperature by the function generating means 121 is based. Although the methane to ethane ratio used in determining the function to be applied by the function generating means 121 and the methane to ethane ratio utilized as the bottom product set point signal 131 is preferably the same, adaptation of the analysis recorder-controller means 132 can be utilized to provide correction to the signal generated by the function generating means 121 even though the methane to ethane ratio represented by the set point signal 131 and the methane to ethane ratio used in determining the transfer function of the function generating means 121 may differ.

While the correction signal 133 can be applied in any suitable manner to the temperature requirement signal 126 in order to produce a temperature set point signal for control of the bottom temperature of the demethanizer column 32, the presently preferred correction signal 133 is added to the temperature requirement signal 126 by adding means 135 to produce a temperature set point signal 136. In such a system, the output of the analysis recorder-controller 132 provides a correction factor signal 33 which can be used as a variable bias signal in adjusting the temperature requirement signal 126 to produce the temperature set point signal 136.

A temperature recorder-controller means 141, which can be any suitable control means but which preferably has a control transfer function of the general proportional-integral-derivative form set forth hereinabove, delivers, in response to a comparison of the column bottom temperature signal 112 and the temperature set point signal 136, a temperature control signal 142. The characteristics of the control function of the temperature recorder-controller 141 are preferably such that the temperature control signal 142, when multiplied by the feed flow rate signal 102 by a multiplier means 145 will provide a suitable heat flow set point signal 146 representative of the rate of heat flow to the demethanizer column reboiler required to provide the demethanizer column bottom temperature represented by the temperature set point signal 136.

A multiplying means 151 multiplies the flow rate signal 106 representative of the liquid material flow to the bottom reboiler heat exchange means 15 by the temperature difference signal 109 representative of the temperature drop between the inlet and outlet conduits of the bottom reboiler heat exchange means 15 to obtain a measured heat flow signal 152 representative of the rate at which heat is being transmitted to the reboiler heat exchanger means 15. A heat recorder-controller means 155, in response to a comparison of the heat set point signal 146 and the measured heat signal 152, delivers a heat control signal 156 to the actuating means of the valve 61 to initiate the change of position of the valve means 61 necessary to provide a heat flow rate specified by the heat set point signal 146.

While the use of a function generating means 121 responsive only to the column pressure signal 115 is presently preferred for its simplicity and adequacy in controlling a process, particularly a cryogenic natural gas liquids separation process is presently preferred, other function generating means such as the illustrated function generating means 161 responsive both to the column pressure signal 115 and to the bottom product analysis signal 119 or bottom product analysis set point signal 131 can be utilized to provide an alternative equivalent temperature signal 162. In a similar manner, where the composition of the feedstream to the process is subject to variation, analysis of that stream and inclusion of a feedstream analysis correction signal applied to the temperature requirement signal or incorporated into the function generated by a function generating means producing a temperature equivalent signal, could be utilized in appropriate cases, as will be clear from an understanding of the process characteristics illustrated by FIG. 3.

In operation, the system illustrated by FIG. 1 provides control of the flow of heating fluid to the reboiler heat exchange means 15 in response primarily to the measurement of pressure within the demethanizer column with an adjustment being made by the analysis recorder-controller output signal 133 to compensate for differences between the actual measured bottom product constituent content and the desired bottom product constituent content used as the basis for the conversion of the column pressure signal to a required bottom temperature signal. Since the column pressure signal 115 is converted directly and without delay into a required bottom temperature signal, the control system is particularly responsive to rapid changes in column pressure which, due to the inherent delay in the time required for a change in column pressure to result in a substantial change in the bottom product composition and the additional time required for such a composition change to be analyzed and produced as an analysis signal, results in much more responsive control of the demethanizer column. The continued use of the analysis recorder-controller to generate a correction signal insures that, even at operating conditions wherein the bottom product composition is substantially different from that assumed when selecting the characteristics of the function generating means 121 or when an unforeseen change in feed material composition to the process is encountered, the long-term control of the process will continue to be maintained to provide a bottom product composition as close as possible to that specified by the bottom product composition set point signal 131.

FIG. 2 illustrates a preferred implementation used in generating a temperature set point signal in accordance with the invention. The demethanizer column 32 having an associated overhead conduit 51 and bottom product conduit 42 is the same as illustrated by FIG. 1. Other equipment associated with the fractionation column has been omitted for ease of illustration. The pressure signal 115 delivered by the pressure transducer means 114 is delivered to a particularly preferred function generating means 221 wherein the relationship between the measured pressure signal 115 ($P_C$) and the temperature requirement signal 226 ($T_R$) is as graphically illustrated in the block representing the function generating means 221 with the relationship being of the general form $$T_R = A + BP_C$$

where $T_R$ is the temperature requirement signal 226; where $P_C$ is the measured column pressure signal 115; and where $A$ and $B$ are constants. As previously indicated, the immediate conversion of the pressure signal 115 to a required temperature signal 226 is advantageous in permitting immediate alteration of the temperature set point signal without waiting for the pressure change to result in a change in measured bottom product analysis. However, in some systems unnecessary alteration of the temperature set point signal in response to transient pressure variations could result in unnecessary control changes or variations. For this reason it is preferred that the temperature requirement signal 226 be filtered using appropriate signal filtering means 227 in order to produce a more stable temperature requirement signal 226a signal which is less subject to unnecessary fluctuation based on insignificant fluctuations, transient fluctuations, or "noise" appearing in the pressure signal 115.

The analysis transducing means or analyzer 118 producing an analysis signal 119 and an analysis recorder-controller 132 utilizing the analysis signal 119 and analysis set point signal 131 as inputs thereto operates as illustrated in FIG. 1 to produce a temperature requirement adjustment signal or correction signal 133 which is added to the temperature requirement signal 226a by an adding means 235 to produce a temperature set point signal 236 suitable for use as the set point to the temperature recorder-controller 141 of FIG. 1.

As previously indicated, the nature of the correction applied to the temperature requirement signal 126 or 226a to produce a suitable temperature set point signal 136 or 236 could vary considerably and could be adapted to include multiplication by a correction factor or any of a variety of more complicated relationships. The preferred embodiment illustrated by FIGS. 1 and 2 using a correction factor which is added to the temperature requirement signal is presently preferred due to the unique relationship which has been discovered to exist between column pressure and column bottom temperature over the operating range of columns such as the fractionation column 32. In this context, adding a correction factor is intended in its broadest algebraic sense and would, obviously, include subtraction of an appropriate bias signal as well as actual addition of a bias signal to the temperature requirement signal.

FIG. 3 illustrates the unique relationship between temperature and pressure for a demethanizer associated with a natural gas liquids separation process with typical pressures within the range of from about 220 psi (about 1520 kPa) to about 290 psi (about 2000 kPa) and column bottom temperatures within the range of from about 40° F. (4° C.) to about 80° F (27° C). Within these ranges of temperature and pressure the pressure to temperature relationships at constant column operating conditions and constant process feed composition is a generally straight line which can be defined by the equation $$T_R = A + BP_C$$

where $T_R$, $P_O$, $A$, and $B$ are as previously defined. For variations in bottom product composition with process parameters other than pressure remaining substantially constant, a family of generally parallel straight line relationships is produced by the associated pressure-temperature relationships. For example, in FIG. 3, with a methane to ethane ratio of 0.025 the pressure-temperature relationship is illustrated by line A. For a methane to ethane ratio of 0.03, the relationship is illustrated by line B, and with a methane to ethane ratio of 0.0325, line C illustrates the pressure-temperature relationship. It can therefore be readily seen that for a constant bottom product methane to ethane ratio the temperature of the demethanizer column could be controlled solely by the measurement of column pressure and generation of the column bottom temperature set point signal determined by the pressure-temperature relationship at the specified bottom product constituent ratio. Since bottom product constituent ratios will nearly always exhibit some variation in any practical system, however, the additive correction factor or temperature requirement adjustment signal 133 can be generated in response to analysis of the bottom product to provide a bias correction equivalent to the vertical distance between the pressure-temperature line for the column operating pressure at the preselected product constituent ratio used in selecting the pressure-temperature function generation characteristics and the generally parallel curve which characterizes the pressure-temperature characteristic at the measured bottom product constituent content. For example, assuming a measured column operating pressure of $P_0$ and a preselected methane to ethane ratio in the column bottom product of 0.03, the pressure-temperature characteristic implemented by the function generating means 121 or 221 is illustrated by line D of FIG. 3, and the temperature requirement signal 126 or 226 delivered by the function generating means would be representative of $T_1$ of FIG. 3. If, however, the actual methane to ethane concentration in the bottom product as determined by the analysis transducer 118 and represented by the analysis signal 119 is 0.025, the correction signal 133 would be applied by adding to the signal representative of temperature $T_1$ to produce a temperature set point signal 136 or 236 representative of the temperature $T_2$ of FIG. 3. In a similar manner if the analysis signal 119 represented a measured bottom methane to ethane ratio of 0.0325, for example, a negative signal 133 would be "added" to the $T_1$ signal to produce an appropriate temperature set point signal representative of a temperature lower than $T_1$.

When the composition of the feed material provided to the separation process of FIG. 1 by the feed conduit means 11 changes, the family of characteristic pressure-temperature curves also changes. In general, there is a vertical shift in the pressure-temperature relationship as illustrated by FIG. 3. For example, lines B and D both represent the pressure-temperature relationship for the same system under generally the same operating conditions at a demethanizer bottom product methane to ethane concentration of 0.03 but with different feed material compositions provided to the process through the feed conduit means 11. In a similar manner, other process variables cause similar curve shifts. Using the same feed composition and demethanizer column methane to ethane ratio (0.03) as used to provide the pressure-temperature relationship of line B in FIG. 3, line E results if the expander 34 of FIG. 1 is not used. The condition represented by line E of FIG. 3 would be equivalent to an expander failure in which the expander is effectively removed from the system and bypassed. It can be readily understood that bias factors in addition to the correction factor 133 generated by the analysis recorder-controller 132 can be added to the control system in order to account for changes in feed composition, changes resulting from equipment outages, and other similar expected or unexpected process changes.

The location at which column pressure is measured may, in some cases, have some effect on the location of the characteristic pressure-temperature relationship for a particular column. This is caused by the fact that some pressure drop, usually a relatively small pressure drop, is observed across some fractionation columns. Other columns may operate at a generally uniform pressure throughout. While measurement of column pressure in the bottom portion of the column will provide the most direct determination of the pressure with which the pressure-temperature relationship is concerned, measurement at any preselected, convenient location within the column is satisfactory and can be with a slight adjustment, if necessary, of the characteristic pressure-temperature curves to account for any pressure difference between the point of measurement and the bottom of the column which may be characteristic of the particular column.

While the invention has been discussed and illustrated in conjunction with a preferred embodiment wherein the pressure-temperature relationship within the fractionating column can be expressed by a family of generally parallel straight line curves, the apparatus and method of the invention are equally applicable to columns in which the pressure-temperature relationship is curved rather than straight or is characterized by a family of curves defined by a more complicated relationship. Available equipment such as the variable diode function generator disclosed by U.S. Pat. No. 3,549,998 can be utilized to provide a function generating means 121 or 221 which can implement a variety of relationships between column pressure and column temperature in order to immediately translate the measuring column pressure signal to a required bottom temperature signal. When such a curve is chosen to accurately represent the operating pressure-temperature characteristics of the controlled fractionation column, the same corrective bias signals discussed hereinabove are useful in correcting the bottom temperature requirement signal or variations in actual bottom product composition, feed material composition, equipment changes, and/or other similar variations or modifications.

Although any suitable equipment can be utilized in implementing the apparatus and method of the invention, particularly preferred apparatus for use in conjunction with a low-temperature natural gas liquid demethanizing column is as follows:

| | |
|---|---|
| Flow transducer 101 | Electrically operated differential pressure cell connected to Foxboro Dynalog recorder-controller sold by the Foxboro Corp., Foxboro, Mass. |
| Flow transducer 105 | Electrically operated differential pressure cell connected to Foxboro Dynalog recorder-controller sold by the Foxboro Corp., Foxboro, Mass. |
| Temperature differential transducer 108 | Model 3354/25 differential input amplifier sold by Burr-Brown Research Corp., Tucson, Ariz. 85706 |
| Temperature transducer 111 | Current-to-pressure transducer 69TA-2R sold by the Foxboro Corporation connected to a thermocouple as MK-3-316W from Foxboro Corp. |
| Pressure transducer 114 | Foxboro-Baldwin fluid pressure cell connected to a Foxboro Dyanlog recorder-controller |
| Analysis transducer 118 | Model 214 process chromatographic analyzer sold by Applied Automation, Inc., Bartlesville, Okla. 74004 |
| Function generator 121 and 221 | Applied Automation No. B03983 sold by Applied Automation, Inc. Bartlesville, Okla. 74004 |
| Recorder-controller 132, 141 and 155 | P.I. Controller AAI component No. B03979 and derivative feedback sold by Applied Automation, Inc., Bartlesville, Okla. 74004 |
| Adder 135 and 235 | Applied Automation, Inc. No. B05885, multiuse amplifier |
| Multiplier 145 and 151 | Model 4029/25 Multiplier sold by Burr-Brown Corp, Tucson, Ariz. 85706 |
| Filter 227 | Applied Automation No. B03989 sold by Applied Automation, Inc. Bartlesville, Okla. 74004 |

In addition to the various control system modifications which will be apparent to those skilled in the art in view of applicants' disclosure and claims, the apparatus and method of the invention are useful in a variety of process applications and in conjunction with a variety of process configurations. For example, the control of heat to the reboiler 15 of FIG. 1 is applicable to any heat source or heat stream which may be utilized, and although the invention is particularly useful in the control of cryogenic fractionation processes, it can be equally useful for any fractionation process in which fluctuation in temperature capable of having a significant effect on column product composition will be encountered. In addition, other variations and modifications by those skilled in the art are considered to be within the scope of the foregoing specification and of the claims appended hereto.

What is claimed is:

1. Apparatus comprising:
   fractionation column means for receiving at least one feed material stream and delivering an overhead product stream from the top portion thereof and a bottom product stream from the bottom portion thereof;
   heating means for providing heat to said bottom portion of said fractionation column means;
   temperature transducer means for sensing a column bottom temperature within said fractionation column means adjacent the bottom thereof and delivering a bottom temperature signal representative of the thus sensed temperature;
   temperature controller means for controlling the amount of heat flow delivered to said bottom portion of said fractionation column means by said heating means in response to a comparison of said bottom temperature signal with a bottom temperature set point signal;
   pressure transducer means for sensing the pressure at a preselected location within said fractionation column means and delivering a column pressure signal representative of the thus sensed pressure;
   signal conversion means for accepting said column pressure signal and delivering in response thereto a temperature requirement signal representative of the value of said column bottom temperature required to provide a preselected value of a constituent ratio in said bottom product stream at the column pressure represented by said column pressure signal;
   analyzer means for analyzing said bottom product stream and delivering an analysis signal representative of the analyzed value of said constituent ratio within said bottom product stream;
   analysis controller means for delivering, in response to comparison of said analysis signal with a constituent ratio set point signal, a temperature requirement adjustment signal representative of the adjustment of said temperature requirement signal necessary to compensate for the difference between said preselected value of said constituent ratio and the analyzed value of said constituent ratio; and
   correction means for applying said temperature requirement adjustment signal to said temperature requirement signal to produce said bottom temperature set point signal.

2. Apparatus in accordance with claim 1 wherein said correction means comprises means for adding said temperature requirement adjustment signal to said temperature requirement signal to produce said temperature set point signal.

3. Apparatus in accordance with claim 1 wherein said signal conversion means comprises means for simulating the relationship between said column pressure signal and said bottom temperature signal for said preselected value of said constituent ratio in said bottom product stream.

4. Apparatus in accordance with claim 3 wherein said signal conversion means comprises a diode function generator.

5. Apparatus in accordance with claim 3 wherein said signal conversion means is adapted to provide a temperature requirement signal which fulfills the general condition:

$$T_R = A + BP_c$$

where $T_R$ is said temperature requirement signal, $P_c$ is said column pressure signal, and $A$ and $B$ are constants.

6. Apparatus in accordance with claim 5 wherein said correction means comprises means for adding said temperature requirement adjustment signal to said temperature requirement signal to produce said bottom temperature set point signal.

7. Apparatus in accordance with claim 1 wherein said fractionation column means comprises a demethanizer column of a cryogenic natural gas separation plant.

8. Apparatus in accordance with claim 7 wherein said constituent ratio in said bottom product stream comprises the methane to ethane ratio of said bottom product stream, wherein said constituent ratio set point signal comprises a signal representative of a desired methane to ethane ratio, and wherein said analyzer means is adapted to deliver an analysis signal representative of the actual methane to ethane ratio of said bottom product stream.

9. Apparatus in accordance with claim 8 wherein said signal conversion means comprises means for simulating the relationship between said column pressure signal and said bottom temperature signal for said preselected value of said constituent ratio in said bottom product stream.

10. Apparatus in accordance with claim 9 wherein said correction means comprises means for adding said temperature requirement adjustment signal to said temperature requirement signal to produce said temperature set point signal.

11. Apparatus in accordance with claim 10 wherein said signal conversion means is adapted to provide a temperature requirement signal which fulfills the general condition:

$$T_R = A + BP_c$$

where $T_R$ is said temperature requirement signal, $P_c$ is said column pressure signal, and A and B are constants.

12. A method for operating a fractionation column, said method comprising:
providing at least one feed material stream to said fractionation column;
recovering an overhead product stream from the top portion of said fractionation column;
recovering a bottom product stream from the bottom portion of said fractionation column;
generating a column bottom temperature signal representative of the temperature within said fractionation column adjacent the bottom thereof;
generating a column pressure signal representative of the pressure at a preselected location within said fractionation column;
generating an analysis signal representative of the composition of said bottom product stream;
generating, in response to said column pressure signal and said analysis signal, a temperature set point signal representative of the fractionation column bottom temperature required to provide a preselected bottom product composition; and
controlling the flow of heat to the bottom portion of said fractionation column in response to a comparison of said bottom temperature signal and said temperature set point signal to provide a fractionation column bottom temperature represented by said temperature set point signal.

13. A method in accordance with claim 12 wherein generating said temperature set point signal comprises:
generating, in response to said column pressure signal, a temperature requirement signal representative of the fractionation column bottom temperature required to provide a preselected bottom product composition at the column pressure represented by said column pressure signal;
generating, in response to said analysis signal, a temperature requirement adjustment signal representative of the adjustment of said temperature requirement signal necessary to compensate for the difference between the analyzed composition of said bottom product stream and said preselected bottom product composition; and
combining said temperature requirement signal and said temperature requirement adjustment signal to generate said temperature set point signal.

14. A method in accordance with claim 13 wherein combining said temperature requirement signal and said temperature requirement adjustment signal comprises adding said temperature requirement signal and said temperature requirement adjustment signal.

15. A method in accordance with claim 13 wherein said temperature requirement signal fulfills the general condition:

$$T_R = A + BP_c$$

where $T_R$ is said temperature requirement signal, $P_c$ is said column pressure signal, and A and B are constants.

16. A method in accordance with claim 15 wherein combining said temperature requirement signal and said temperature requirement adjustment signal comprises adding said temperature requirement signal and said temperature requirement adjustment signal.

17. A method in accordance with claim 16 wherein said analysis signal comprises a methane to ethane ratio signal and wherein said preselected bottom product composition comprises a composition characterized by a preselected methane to ethane ratio.

18. A method in accordance with claim 17 wherein generating said temperature requirement adjustment signal comprises comparing said analysis signal with an analysis set point signal representative of a desired methane to ethane ratio in said bottom product stream and generating said temperature requirement adjustment signal in response to said comparison.

19. A method in accordance with claim 18 wherein the methane to ethane ratio represented by said analysis set point signal is the same as said preselected methane to ethane ratio.

20. A method in accordance with claim 19 wherein controlling the flow of heat to the bottom of said fractionation column comprises:
generating a temperature control signal in response to the comparison of said bottom temperature signal and said temperature set point signal;
combining said temperature control signal with a feed flow rate signal representative of the total flow rate of feed material to said fractionation column to produce a heat flow set point signal representative of the desired flow rate of heat to the bottom of said fractionation column;
generating a heat delivery signal representative of the measured rate of heat flow to the bottom of said fractionation column; and
controlling the flow rate of a heat-containing fluid to heat exchanger means associated with the bottom of said fractionation column in response to a comparison of said heat flow set point signal with said heat delivery signal to provide a flow of heat to the bottom portion of said fractionation column represented by said heat flow set point signal.

21. A method in accordance with claim 20 wherein said heat-containing fluid comprises at least a portion of the total feed material provided to said fractionation column.

* * * * *